H. O. LEE.
AUTOMOBILE DRIVING MECHANISM.
APPLICATION FILED FEB. 1, 1913.

1,150,212.

Patented Aug. 17, 1915.
2 SHEETS—SHEET 1.

Witnesses

Inventor
Halvor O. Lee
By Victor J. Evans
Attorney

H. O. LEE.
AUTOMOBILE DRIVING MECHANISM.
APPLICATION FILED FEB. 1, 1913.

1,150,212.

Patented Aug. 17, 1915.
2 SHEETS—SHEET 2.

Inventor
Halvor O. Lee
By Victor J. Evans
Attorney

Witnesses

UNITED STATES PATENT OFFICE.

HALVOR O. LEE, OF ROGERS, MINNESOTA.

AUTOMOBILE DRIVING MECHANISM.

1,150,212.  Specification of Letters Patent.  Patented Aug. 17, 1915.

Application filed February 1, 1913.  Serial No. 745,667.

*To all whom it may concern:*

Be it known that I, HALVOR O. LEE, a citizen of the United States, residing at Rogers, in the county of Hennepin and State of Minnesota, have invented new and useful Improvements in Automobile Driving Mechanism, of which the following is a specification.

This invention relates to automobile driving mechanism, the object in view being to provide simple and reliable mechanism for imparting the motion of the engine to the driving wheels of the machine, and also varying the speed of the driving wheels relatively to the speed of the motor, without interfering with the differential mechanism, the arrangement hereinafter described also providing for throwing the drive shaft of the machine out of driving engagement with the driving axle of the machine.

With the above and other objects in view, the invention consists in the construction, combination and arrangement of parts, as will be hereinafter more fully described, illustrated in the accompanying drawings, and pointed out in the claim hereunto appended.

Figure 1:
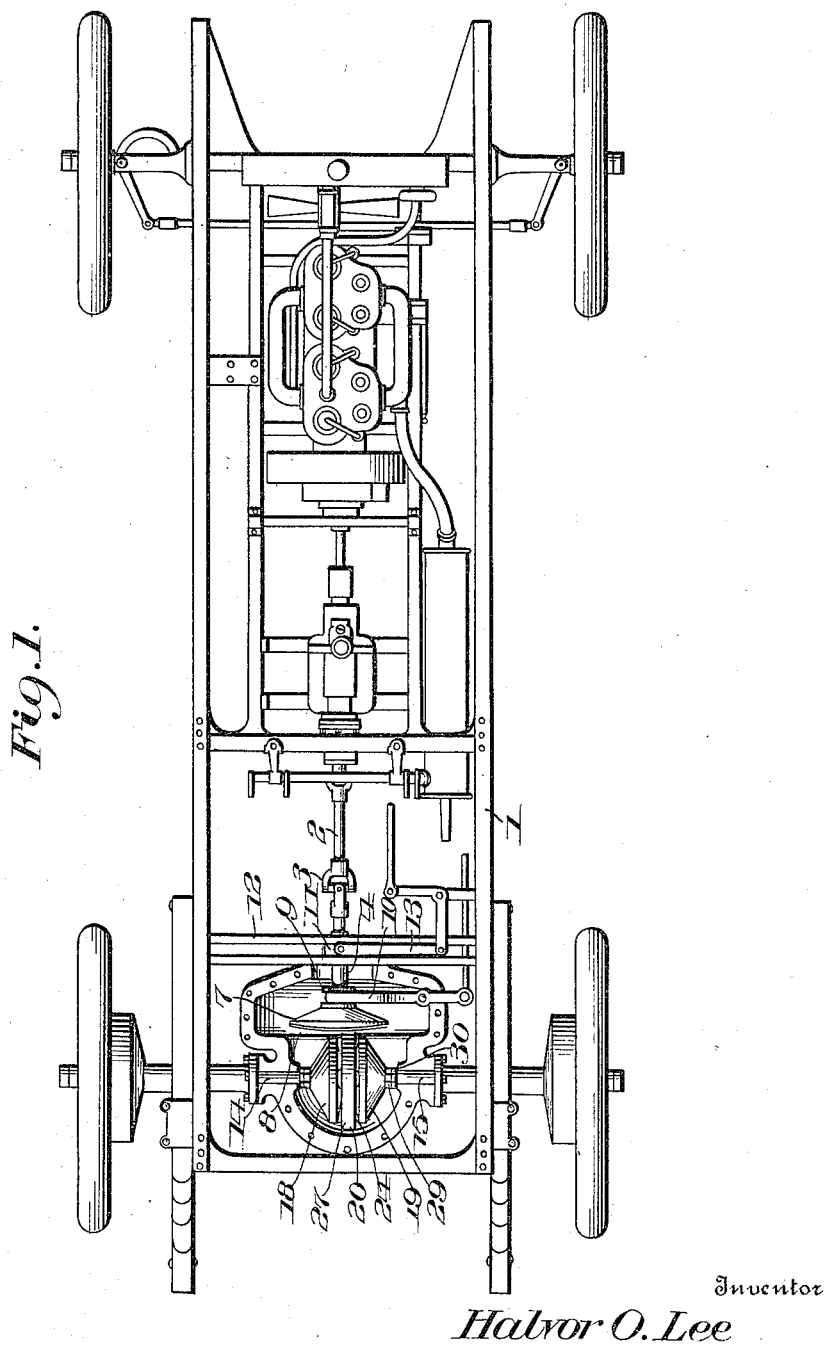
Figure 2:
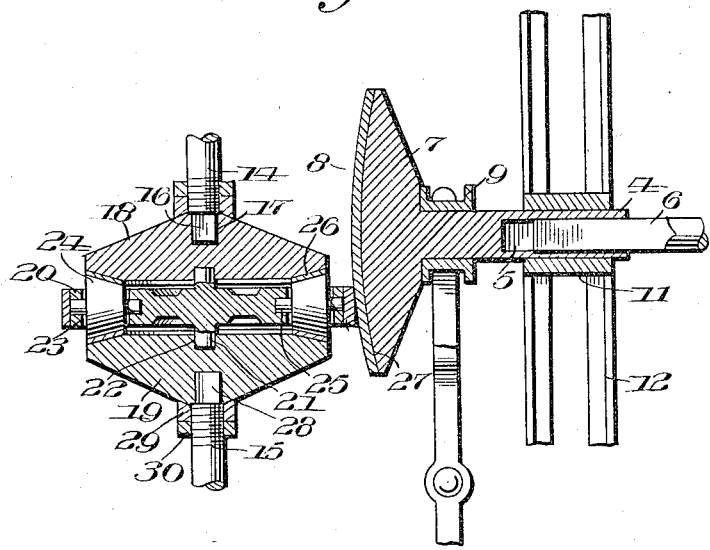
Figure 3:
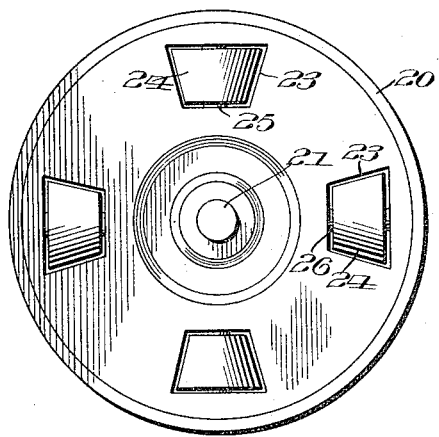

In the drawings: Figure 1 is a plan view of the chassis and running gear of an automobile, showing the invention applied thereto. Fig. 2 is a detail horizontal section through the differential and friction drive. Fig. 3 is a side elevation of the friction wheel.

Referring to the drawings, 1 designates the frame or chassis of an automobile, in which is mounted the usual centrally arranged driving shaft 2 which extends from the universal joint 3 backwardly to a point adjacent to the driving axle.

In carrying out this invention, the drive shaft 2 is provided at its rear end with a short telescopic extension or stub shaft 4 having a square socket 5, in which the correspondingly squared extremity 6 of the main section of the drive shaft 2 is received, thereby permitting a limited longitudinal sliding movement of the rear extension 4 of the drive shaft, for a purpose which will hereinafter appear.

Fast on the rear end of the drive shaft extension 4 is a friction drive disk 7, the working face 8 of which is preferably rounded or convex, as shown, in order to enable said friction drive disk to be shifted laterally across the periphery of the friction wheel, hereinafter described, for the purpose of changing the relative speeds between the driving shaft 2 and the driving axle.

In order to admit of the two movements hereinabove referred to, the shaft extension 4 is provided with a grooved collar 9, encircling the same, as shown in Fig. 2, and adapted to receive a shifting fork 10, by means of which the disk 7 may be moved in a fore and aft direction. To provide for the lateral movement of the shaft extension 4, the latter is mounted in a suitable bearing 11 which is adapted to slide back and forth in a guide frame 12 extending transversely of the chassis, the bearing 11 being shifted by means of connecting rods 13, or their equivalent, to a suitable lever arranged within reach of the driver in his seat on the machine.

The driving axle is divided into two sections 14 and 15, the inner ends of which are squared, as shown at 16, and inserted in correspondingly formed sockets 17 centrally of the outer sides of a pair of oppositely located wheels 18 and 19. Between the wheels 18 and 19 is mounted a friction drive wheel 20 which has short stud shafts 21 extending from opposite sides thereof and concentric therewith, the stud shafts 21 being received in sockets 22 in the wheels 18 and 19. This permits the wheel 20 to turn independently of either of the wheels 18 and 19, and vice versa.

The wheel 20 is provided at a plurality of points with openings 23 extending through the same, and in each of said openings is journaled a pinion 24 on a shaft 25 extending radially with respect to the axis of movement of the wheel 20, as shown in Fig. 3. The pinions 24 are frusto-conical in shape, and the wheels 18 and 19 are provided with correspondingly inclined or pitched contact faces 26, against which the pinions 24 bear at diametrically opposite points.

The wheel 20 is provided with a tread 27 of rubber, leather, or other suitable material, covering the entire periphery thereof and working in contact with the working face 8 of the friction drive disk 7, as shown in Fig. 2.

From the foregoing description, it will now be understood that the differential mechanism referred to admits of one of the driving wheels and its shaft turning faster than the other, so as to compensate for the necessary difference in speed of the driving wheels, when making their turn. It will also be seen that the friction drive disk 7 is mounted so as to adapt it to be shifted across the periphery of the friction drive wheel 20, for the purpose of varying the speed of the driving wheel 20 relatively to that of the drive shaft 2. When the wheel 20 is in line with the center of the disk 7, there will be no movement imparted to the driving axle, and when the disk 7 is shifted so as to bring the center thereof beyond the normal driving center, a reverse movement will be imparted to the wheel 20, and, therefore, to the driving axle sections 14 and 15, on which the driving wheels are mounted in the ordinary manner. It will, therefore, be observed that the mechanism herein described provides for varying the speed of the driving axle with relation to the speed of the motor and drive shaft, and for reversing the movement of the driving axle. Furthermore, the driving disk may be moved out of working contact with the wheel 20, thereby serving the function of the ordinary foot operated clutch for disconnecting the engine from the driving axle.

What is claimed is:

In automobile driving mechanism, the combination of a divided driving axle, friction gear wheels on the inner ends of the axle sections, a pinion carrier interposed between said gear wheels and embodying a peripheral friction face and pinion receiving slots extending through the body of the carrier, friction pinions journaled in said slots and bearing against said friction gear wheels, a drive shaft, a friction disk having a convex driving face and provided with a stub shaft integral therewith and formed with an axially extending socket non-circular in cross section adapting said stub shaft to slide upon and longitudinally of the driving shaft while driven rotatably thereby, means for shifting said disk across the periphery of the friction wheel, a collar around said stub shaft, a manually controlled shifting fork engaging said collar and operating to slide said friction disk and its stub shaft longitudinally of the drive shaft, and a laterally shiftable bearing in which the telescoping ends of the stub shaft and drive shaft are supported.

In testimony whereof I affix my signature in presence of two witnesses.

HALVOR O. LEE.

Witnesses:
ANDREW WIGGIN,
WILLIE GALLINGER.

Copies of this patent may be obtained for five cents each, by addressing the "Commissioner of Patents, Washington, D. C."